US012768730B2

(12) United States Patent
Tanaka

(10) Patent No.: US 12,768,730 B2
(45) Date of Patent: Oct. 20, 2026

(54) FORCE SENSOR

(71) Applicant: Japan Display Inc., Tokyo (JP)

(72) Inventor: Hitoshi Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 242 days.

(21) Appl. No.: 18/794,300

(22) Filed: Aug. 5, 2024

(65) Prior Publication Data

US 2024/0393193 A1 Nov. 28, 2024

Related U.S. Application Data

(63) Continuation of application No. 17/572,753, filed on Jan. 11, 2022, now Pat. No. 12,078,557.

(30) Foreign Application Priority Data

Jan. 14, 2021 (JP) ................................ 2021-004305

(51) Int. Cl.
*G01L 1/14* (2006.01)
*G06F 3/041* (2006.01)
*G06F 3/044* (2006.01)

(52) U.S. Cl.
CPC ............ *G01L 1/146* (2013.01); *G06F 3/0414* (2013.01); *G06F 3/0445* (2019.05); *G06F 2203/04105* (2013.01)

(58) Field of Classification Search
None
See application file for complete search history.

(56) References Cited

U.S. PATENT DOCUMENTS 5,592,365 A * 1/1997 Sugimoto .............. H05K 3/323 361/779
2007/0022828 A1 2/2007 Divigalpitiya et al.
(Continued)

FOREIGN PATENT DOCUMENTS

JP 2009-503867 A 1/2009
JP 2018-080956 A 5/2018
JP 2018-189581 A 11/2018

OTHER PUBLICATIONS

Office Action issued in related Japanese Patent Application No. 2021-004305, issued on May 21, 2024 and English translation of same. 7 pages.

(Continued)

*Primary Examiner* — Mark A Shabman
(74) *Attorney, Agent, or Firm* — K&L Gates LLP

(57) ABSTRACT

According to an aspect, a force sensor includes: a plurality of first electrodes that are arranged along a substrate; an elastic body that is in contact with the first electrodes; a second electrode that is in contact with the elastic body, the elastic body being interposed between the second electrode and the first electrodes; and a third electrode that is provided on the substrate side of the second electrode and configured to be electrically coupled to the second electrode. The elastic body includes a conductive particle that electrically couples the first electrodes and the second electrode when force is applied that causes the first electrodes and the second electrode to be approached. The third electrode has a continuous lattice shape that separates at least the first electrodes adjacent in one direction from each other.

16 Claims, 10 Drawing Sheets

(56) References Cited

U.S. PATENT DOCUMENTS

| | | | | |
|---|---|---|---|---|
| 2011/0079501 | A1* | 4/2011 | Arai | G06F 3/0412 361/679.01 |
| 2015/0062461 | A1* | 3/2015 | Tallal | G06F 3/042 349/12 |
| 2018/0039357 | A1* | 2/2018 | Baek | G06F 3/0443 |
| 2018/0136767 | A1 | 5/2018 | Hamada et al. | |
| 2018/0204884 | A1* | 7/2018 | Isa | G06F 3/041 |
| 2018/0314104 | A1* | 11/2018 | Higano | G02F 1/133512 |
| 2019/0025139 | A1* | 1/2019 | Morita | G01L 1/20 |
| 2021/0333651 | A1* | 10/2021 | Tanaka | G02F 1/134309 |
| 2022/0221352 | A1 | 7/2022 | Tanaka | |

OTHER PUBLICATIONS

Notice of Reason for Refusal from corresponding Japanese Patent Application No. 2024-135635, dated Apr. 1, 2025. 6 pages.

* cited by examiner

FORCE SENSOR

CROSS-REFERENCE TO RELATED APPLICATION

This application is a continuation of U.S. application Ser. No. 17/572,753, filed on Jan. 11, 2022, which claims priority from Japanese Patent Application No. 2021-004305 filed on Jan. 14, 2021, the entire contents of which are incorporated herein by reference.

BACKGROUND

1. Technical Field

What is disclosed herein relates to a force sensor.

2. Description of the Related Art

Force sensors are known that detect force based on switching of electrical coupling states of switches that depends on the presence or absence of the force (e.g., Japanese Patent Application Laid-open Publication No. 2018-080956).

A force sensor having a two-dimensional resolution on a force detection surface has a plurality of switches arranged two-dimensionally. In such a sensor, when electrical characteristics of the switches are non-uniform, technical difficulty in achieving accuracy of detecting force is increased at a position of the switch where an electrical change depending on the presence or absence of force is relatively small.

For the foregoing reasons, there is a need for a force sensor that can stably detect force regardless of the detection position of the force.

SUMMARY

According to an aspect, a force sensor includes: a plurality of first electrodes that are arranged along a substrate; an elastic body that is in contact with the first electrodes; a second electrode that is in contact with the elastic body, the elastic body being interposed between the second electrode and the first electrodes; and a third electrode that is provided on the substrate side of the second electrode and configured to be electrically coupled to the second electrode. The elastic body includes a conductive particle that electrically couples the first electrodes and the second electrode when force is applied that causes the first electrodes and the second electrode to be approached. The third electrode has a continuous lattice shape that separates at least the first electrodes adjacent in one direction from each other.

DETAILED DESCRIPTION

The following describes each embodiment of the present disclosure with reference to the drawings. This disclosure is made by way of examples. All appropriate modifications that may be easily conceived by those skilled in the art within the spirit of the invention are naturally included in the scope of the present disclosure. For the purpose of clarity, the widths, thicknesses, and shapes of respective components may be schematically illustrated, and those are illustrated by way of examples and do not limit the interpretation of the present disclosure. In the present specification and the respective drawings, the same elements already described in the previous drawings are labeled with the same symbols, and detailed description thereof may be omitted as appropriate.

In this disclosure, when an element is described as being "on" another element, the element can be directly on the other element, or there can be one or more elements between the element and the other element.

Embodiment

Figure 1:
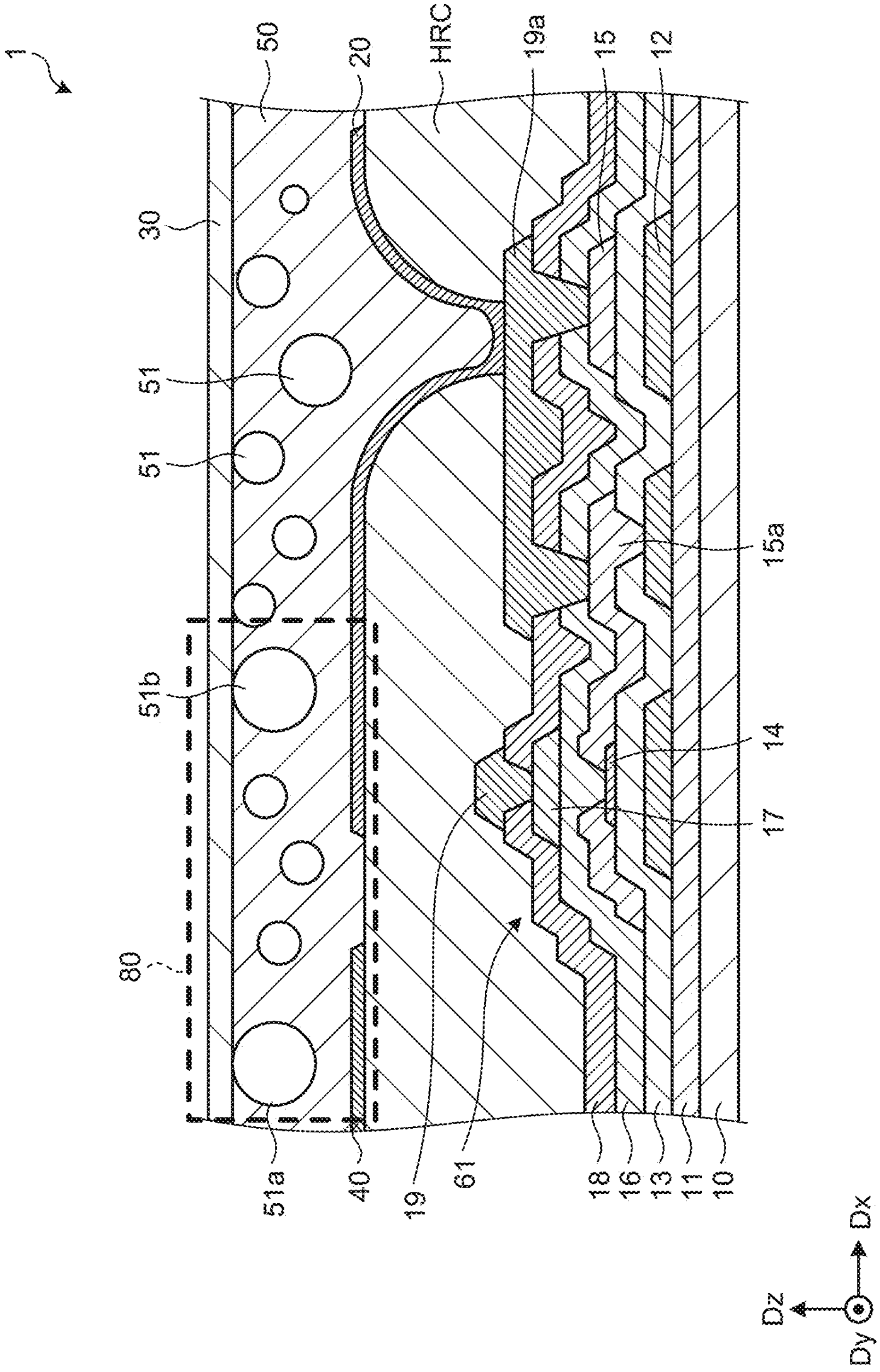
FIG. 1 is a cross-sectional view of a layered structure including main elements of a force sensor.

FIG. 1 is a cross-sectional view of a layered structure including main elements of a force sensor 1. The force sensor 1, which is what is called a device substrate, includes a plurality of elements layered on a substrate 10. The elements include field effect transistors (FETs) of semiconductor. Specifically, an insulation film 11, a first wiring layer 12, a first insulation layer 13, a semiconductor layer 14, a second wiring layer 15, a second insulation layer 16, a third wiring layer 17, a third insulation layer 18, a fourth wiring layer 19, and the like are layered on the substrate 10 in this order from a side closer to the substrate 10. The first wiring layer 12, the second wiring layer 15, the third wiring layer 17 and the fourth wiring layer 19 are formed of a conductive material like metal electrodes, for example. The first insulation layer 13, the second insulation layer 16, and the third insulation layer 18 are formed of insulator including silicon oxide or silicon nitride, for example. The semiconductor layer 14 is a semiconductor that functions as a channel of the FET. When the FET is a metal oxide semiconductor FET (MOSFET), the semiconductor layer 14 is of silicon (Si), for example. The FETs, such as a first element 61 illustrated in FIG. 1, and a second element 62, a third element 63, and a fourth element 64 illustrated in FIG. 3, which is described later, are formed on the substrate 10 by the layered structure.

In the following description, one direction along the substrate 10 is defined as a first direction Dx. The other direction that is along the substrate 10 and orthogonal to the first direction Dx is defined as a second direction Dy. The direction orthogonal to the first direction Dx and the second direction Dy is defined as a third direction Dz. The third direction Dz is the layering direction of the layered structure formed on the substrate 10.

A covering portion HRC, an electrode layer, and the like are layered on the upper side of the fourth wiring layer 19. The covering portion HRC is provided between the fourth wiring layer 19 and the electrode layer to insulate the fourth wiring layer 19 and the electrode layer from each other. The covering portion HRC is an organic layer that restrains force from being applied from the second electrode 30 side, which is described later, to the structure on the lower layer side of the covering portion HRC to protect the lower layer side structure. The electrode layer includes a first electrode 20 and a third electrode 40. The first electrode 20 and the third electrode 40 are spaced apart from each other. An elastic body 50 is provided on the upper side of the electrode layer. The elastic body 50 is a thin film shaped elastic member. The elastic body 50 includes a plurality of conductive particles 51. The elastic body 50 containing the conductive particles 51 has force sensitive conductivity.

The second electrode 30 is provided on the upper side of the elastic body 50. The second electrode 30 is a conductive sheet. The second electrode 30 may be any sheet-shaped member as long as at least a surface of the second electrode 30 on the elastic body 50 side is conductive. More specifically, the second electrode 30 is provided with a compound thin film, such as an indium tin oxide (ITO) thin film, on the elastic body 50 side, for example. The side of the second electrode 30 opposite to the elastic body 50 side thereof may have conductivity or be covered with an insulator such as synthetic resin.

Figure 2:
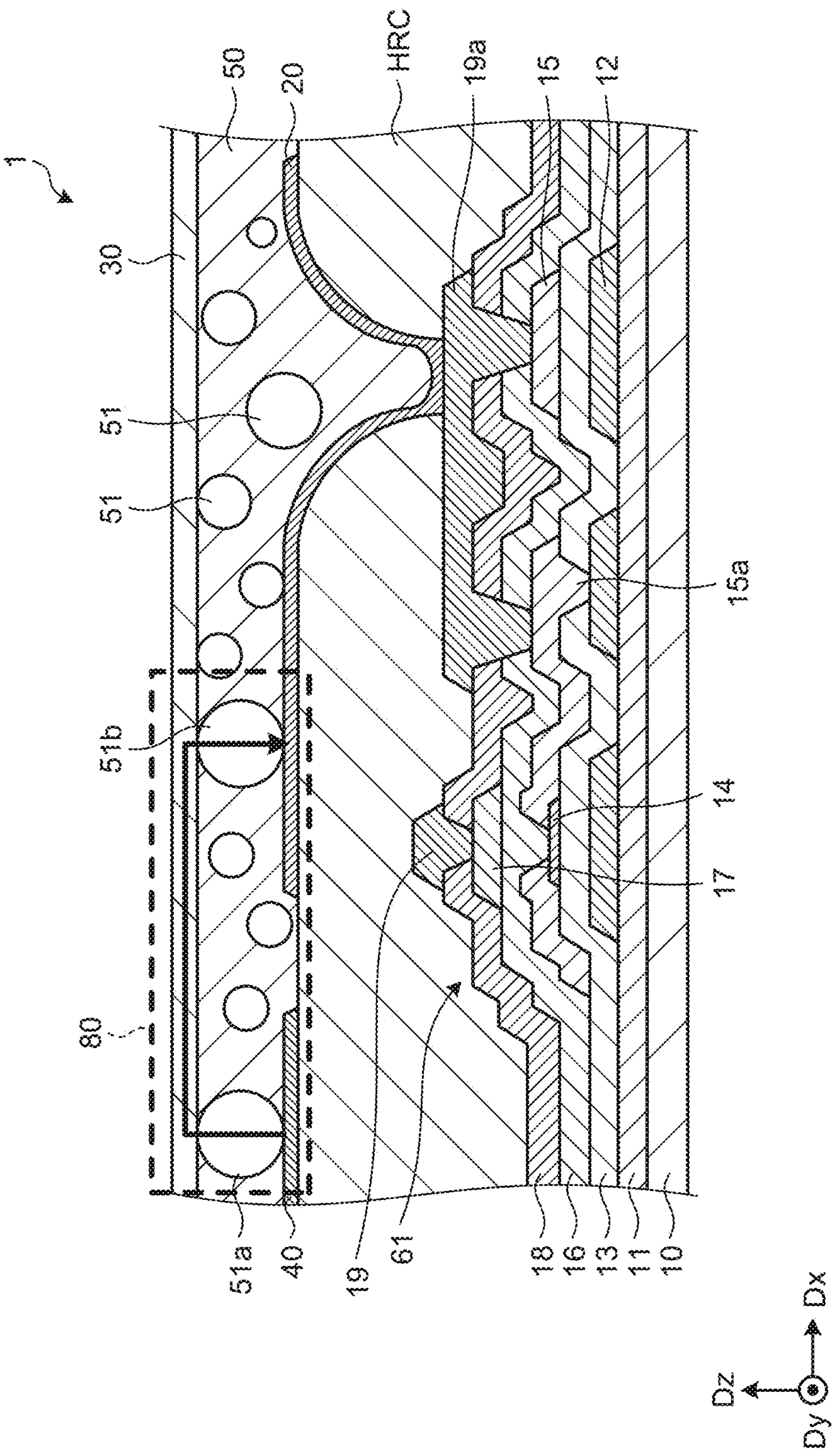
FIG. 2 is a diagram illustrating the force sensor that is receiving force from a second electrode side.

FIG. 2 is a diagram illustrating the force sensor 1 that is receiving force from the second electrode 30 side. When the force sensor 1 illustrated in FIG. 1 receives force in the third direction Dz from the second electrode 30 side, the elastic body 50 is compressed in the third direction Dz, as illustrated in FIG. 2. As a result, some of the conductive particles 51 included in the elastic body 50 form a conduction path that makes electrical conduction between the third electrode 40 and the second electrode 30 and another conduction path that makes electrical conduction between the first electrode 20 and the second electrode 30. FIG. 2 schematically and exemplarily illustrates a state in which a conductive particle 51*a* couples the third electrode 40 and the second electrode 30 while a conductive particle 51*b* couples the first electrode 20 and the second electrode 30. The conductive particles 51*a* and 51*b* are included in the conductive particles 51. When the force in the third direction Dz onto the second electrode 30 side is disappeared, the state returns to a state illustrated in FIG. 1 from a state illustrated in FIG. 2, resulting in the conduction paths being disappeared. As described above, the force sensor 1 can detect force from the second electrode 30 side on the basis of whether the conduction paths are established. The third electrode 40, the second electrode 30, the first electrode 20, and the elastic body 50, which form the conduction paths in response to force from the second electrode 30 side, function as a switch 80 that switches open and close depending on the force. When the second electrode 30 in the embodiment does not receive the force and is not coupled to the first electrode 20 and the third electrode 40, the second electrode 30 is in a floating state.

More specifically, the elastic body 50 has isotropic force sensitive conductivity that establishes the conduction between the third electrode 40 and the second electrode 30 and the conduction between the first electrode 20 and the second electrode 30 in response to force along the third direction Dz and does not establish conduction in other directions (e.g., the direction along the substrate 10). The conductive particles 51 are provided in the elastic body 50 so as to establish such force sensitive conductivity.

In the embodiment, a sheet resistance of the third electrode 40 is less than that of the second electrode 30. Specifically, the electrode layers forming the first electrode 20 and the third electrode 40 are made of metal having high conductivity such as silver (Ag). The concrete composition of the third electrode 40 is not limited to that described above. The third electrode 40 is preferably made of a material having high conductivity as much as possible and a low sheet resistance.

Figure 3:
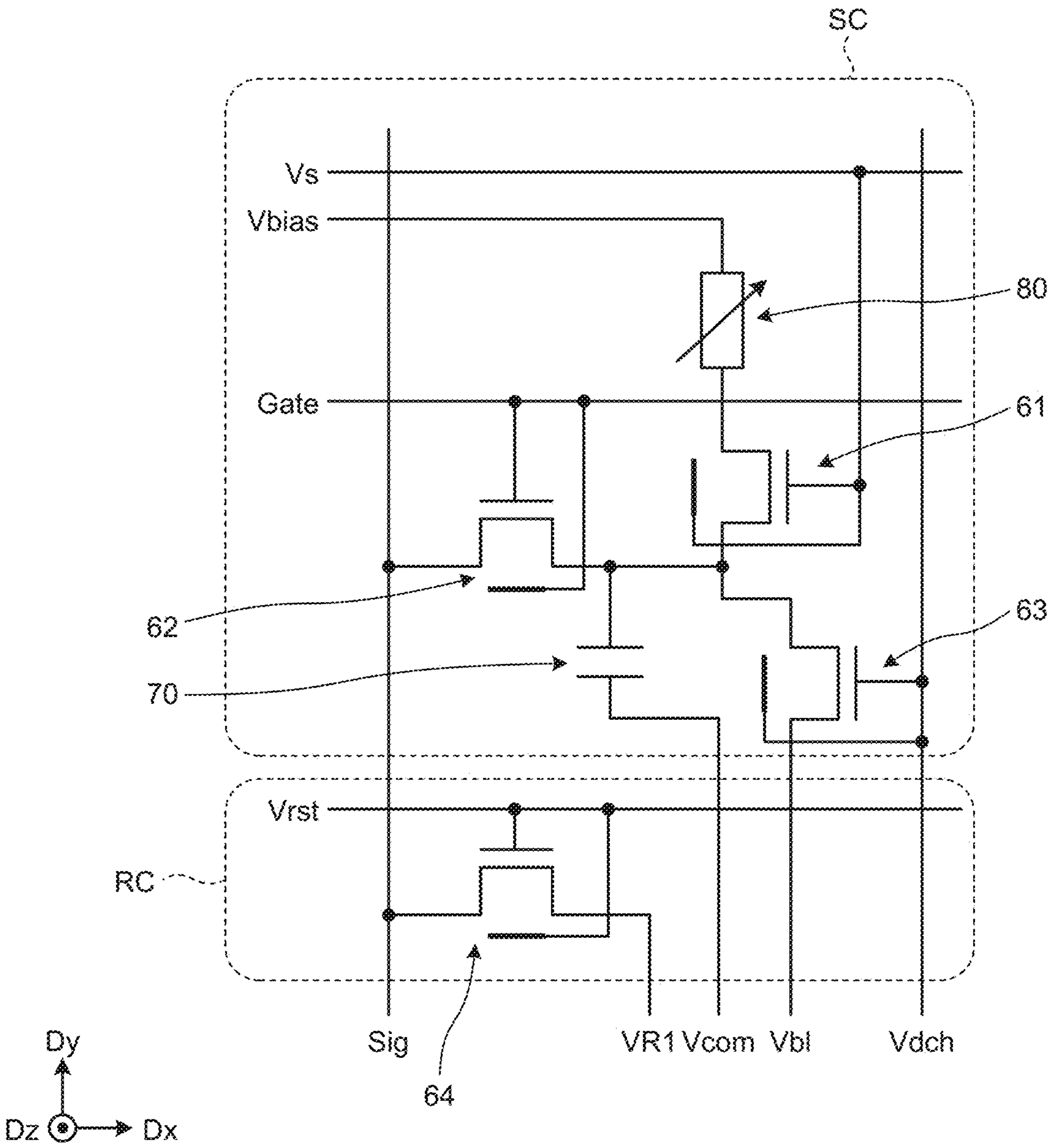
FIG. 3 is a diagram illustrating an exemplary circuit structure of the force sensor.

FIG. 3 is a diagram illustrating an exemplary circuit structure of the force sensor 1. The circuit illustrated in FIG. 3 includes an array circuit SC and a reset circuit RC.

The array structure SC includes the first element 61, the second element 62, and the third element 63. The first element 61, the second element 62, and the third element 63 are FET switching elements. One of a source and a drain of the first element 61 is coupled to the switch 80 while the other is coupled to the second element 62, the third element 63, and a capacitor 70. One of a source and a drain of the second element 62 is coupled to a signal line Sig while the other is coupled to the first element 61, the third element 63, and the capacitor 70. One of a source and a drain of the third element 63 is coupled to an initialization potential line Vbl while the other is coupled to the first element 61, the second element 62, and the capacitor 70. A gate and a back gate of the first element 61 are coupled to a detection operation signal transmission line Vs. A gate and a back gate of the second element 62 are coupled to a scan line Gate. A gate and a back gate of the third element 63 are coupled to an initialization signal transmission line Vdch.

One of two terminals of the capacitor 70 is coupled to a common potential line Vcom while the other is coupled to the first element 61, the second element 62, and the third element 63. The switch 80 is provided such that the switch 80 can open and close the coupling between the one of the source and the drain of the first element 61, and a power supply line Vbias.

The reset circuit RC includes the fourth element 64. The fourth element 64 is an FET switching element. One of a source and a drain of the fourth element 64 is coupled to the signal line Sig while the other is coupled to a reset potential line VR1. A gate and a back gate of the fourth element 64 are coupled to a reset signal transmission line Vrst.

The array circuit SC is provided individually for each array that can detect force individually. As exemplarily illustrated in FIG. 5, which is described later, the force sensor 1 is provided with a plurality of arrays. The scan line Gate is shared by the array circuits SC arranged in the first direction Dx. The signal line Sig is shared by the array circuits SC arranged in the second direction Dy. The detection operation signal transmission line Vs, the power supply line Vbias, the common potential line Vcom, the initialization potential line Vbl, and the initialization signal transmission line Vdch are shared by all of the array circuits SC.

Figure 4:
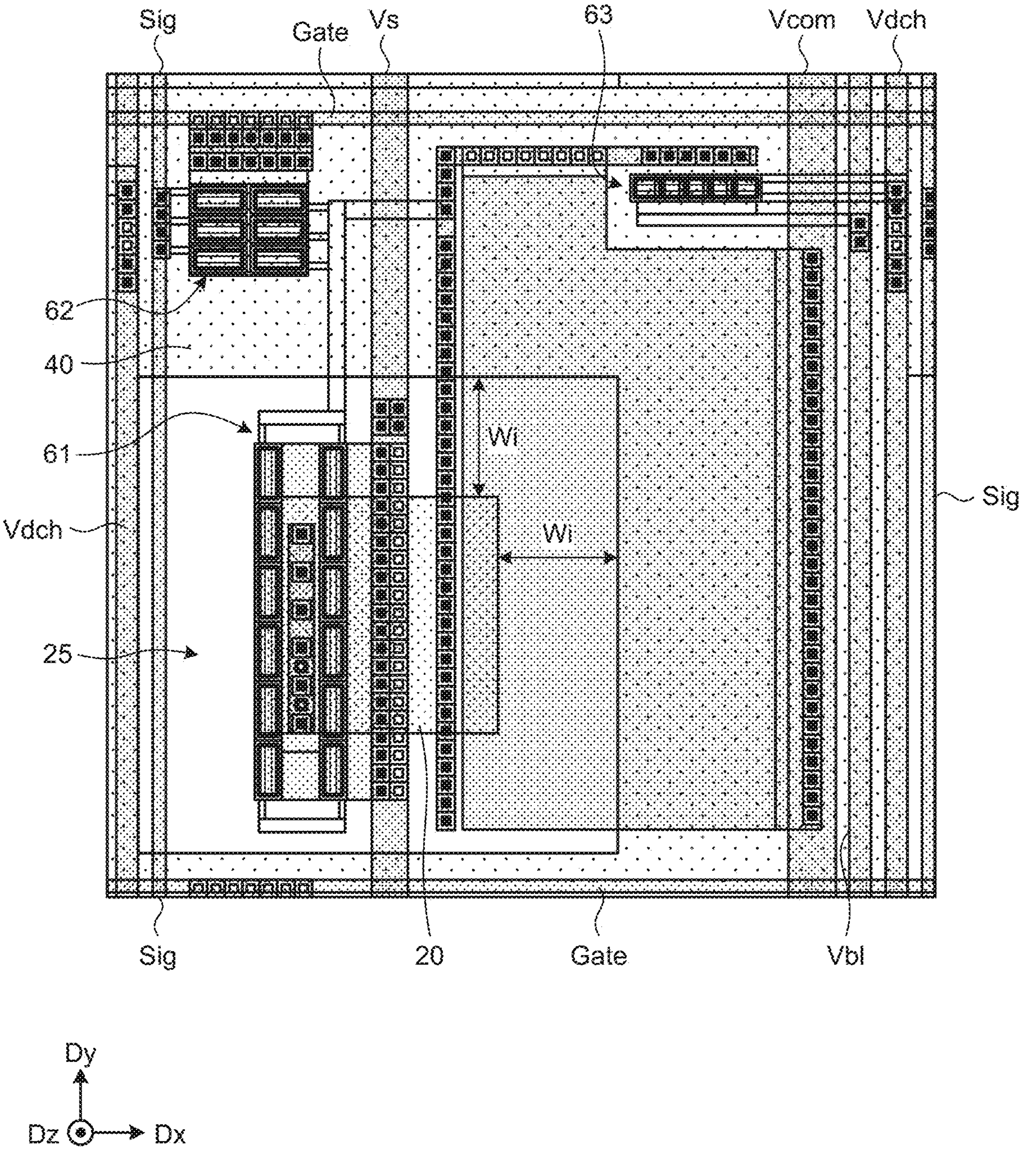
FIG. 4 is a plan view illustrating an exemplary structure of an array.

FIG. 4 is a plan view illustrating an exemplary structure of the array. The plan view is a front view of the first direction Dx-second direction Dy plane along the plate surface of the substrate 10. As illustrated in FIG. 4, the first element 61, the second element 62, and the third element 63 are provided in each of the arrays. The scan line Gate, the signal line Sig, the detection operation signal transmission line Vs, the common potential line Vcom, the initialization potential line Vbl, and the initialization signal transmission line Vdch are provided such that the circuit described with reference to FIG. 3 is achieved. The structure of the array illustrated in FIG. 4 is achieved by the layered structure on the substrate 10 described with reference to FIG. 1. The first electrode 20 and the third electrode 40 illustrated in FIG. 4 are provided in the same layer (electrode layer), as illustrated in FIG. 1. The first element 61, the second element 62, the third element 63, the scan line Gate, the signal line Sig, the detection operation signal transmission line Vs, the common potential line Vcom, the initialization potential line Vbl, and the initialization signal transmission line Vdch are provided on the substrate 10 side of the electrode layer.

As illustrated in FIG. 4, the position of the first element 61 in a plan view and the position of the first electrode 20 in a plan view partially overlap. As illustrated in FIG. 1, the second wiring layer 15 stacked on the upper side of the semiconductor layer 14 of the first element 61 as a FET, includes an electrode 15*a* that is coupled to the semiconductor layer 14 and formed as one of the source and the drain of the first element 61. The electrode 15*a* is coupled to a coupling portion 19*a* via a contact hole formed in the second insulation layer 16 and the third insulation layer 18. The coupling portion 19*a* is formed in forming of the fourth wiring layer 19. The coupling portion 19*a* couples the first electrode 20 and the electrode 15*a*. The coupling portion 19*a* and the first electrode 20 are coupled via a contact hole formed on the upper side of the coupling portion 19*a* in the covering portion HRC. The first electrode 20 has a cross sectional shape that is curved along the contact hole as illustrated in FIG. 1, for example. This shape is, however, an example of the shape of the first electrode 20. The shape of the first electrode 20 is not limited to this example and can be modified as appropriate.

As illustrated in FIGS. 1 and 4, the first electrode 20 is formed so as to be spaced apart from the third electrode 40. FIG. 4 exemplarily illustrates the squire-shaped first electrode 20 that has four sides including two sides facing each other along the first direction Dx and the other two sides facing each other along the second direction Dy. The shape of the first electrode 20 is not limited to this example. The first electrode 20 may have any shape that preferably allows the first electrode 20 to be spaced apart from the third electrode 40. The shape can be modified as appropriate. As illustrated in FIG. 4, one array is provided with one first electrode 20, for example.

Figure 5:
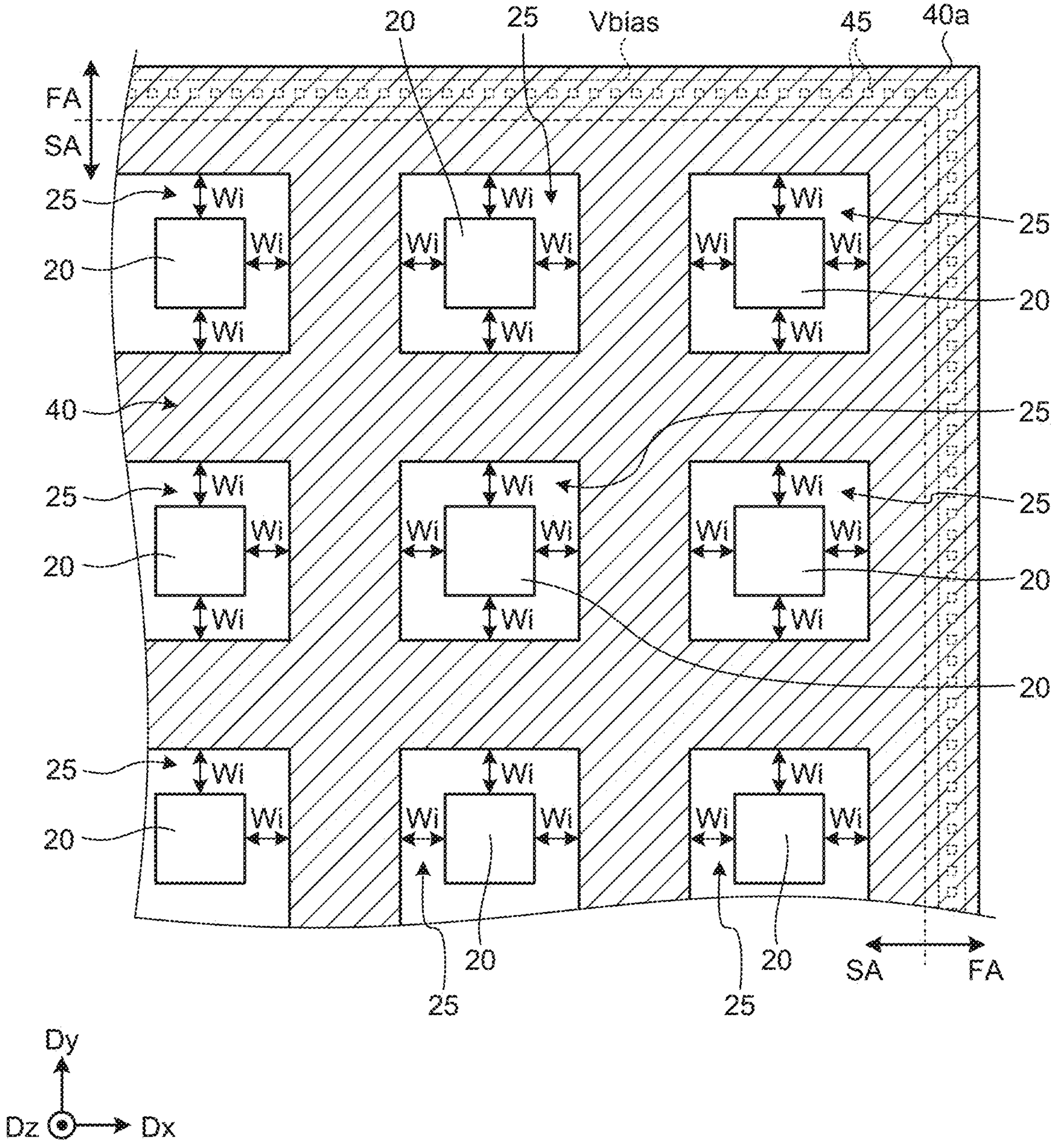
FIG. 5 is a plan view illustrating an exemplary positional relation between the arrays.

FIG. 5 is a plan view illustrating a positional relation between the arrays. As illustrated in FIG. 5, for example, the first electrodes 20, one of which is described with reference to FIG. 4, are provided. The first electrodes 20 illustrated in FIG. 5 are arranged in a matrix of a row-column configuration along the first direction Dx and the second direction Dy. In FIG. 5, the first electrodes 20 are arranged in a matrix of 3×3 in the first direction Dx and the second direction Dy. The actual force sensor 1 includes a larger number of first electrodes 20 than this example. For a concrete example, the first electrodes 20 are arranged in a matrix of 80×84. A pitch between the first electrodes 20 adjacent in the first direction Dx (or the second direction Dy) is 321 μm. The concrete example is only an example. The pitch is not limited to the concrete example and can be modified as appropriate.

The arrays, one of which is described with reference to FIGS. 3 and 4, are provided corresponding to the arrangement of the first electrodes 20 described with reference to FIG. 5. The arrays provided corresponding to the first electrodes 20 arranged along the first direction Dx share the scan line Gate. As illustrated in FIG. 4, the scan line Gate is provided so as to extend along the first direction Dx. The arrays provided corresponding to the first electrodes 20 arranged along the second direction Dy share the signal line Sig. As illustrated in FIG. 4, the signal line Sig is provided so as to extend along the second direction Dy. In the structure of the first electrodes 20 and the arrays that are provided as described above, one signal line Sig extends along the second direction Dy between the adjacent first electrodes 20 of the first electrodes 20 arranged in the first direction Dx, in a plan view. In a plan view, one scan line Gate extends along the first direction Dx between the adjacent first electrodes 20 of the first electrodes 20 arranged in the second direction Dy. In other words, in a plane view, the signal lines Sig and the scan lines Gate separate the first electrodes 20 from each other so as to be arranged in a lattice shape.

As illustrated in FIG. 5, the third electrode 40 is formed as a continuous electrode that separates the first electrodes 20 from each other so as to be arranged in a lattice shape. The third electrode 40 (hatched part) illustrated in FIG. 5 separates the first electrodes 20 arranged in the first direction Dx from each other, and the first electrodes 20 arranged in the second direction Dy from each other. In other words, the third electrode 40 has openings 25 each of which has the first electrode 20 therein. The third electrode 40 has the openings 25 arranged in a matrix of a row-column configuration. The opening 25 separates the first electrode 20 from the third electrode 40. Specifically, as illustrated in FIG. 4, one side of the first electrode 20 and one side of the opening of the third electrode 40 facing the one side of the first electrode 20 are spaced apart with a distance Wi therebetween. The shape of the opening 25 is not limited to square and can be modified as appropriate. The distance Wi is 50 μm, for example. The distance Wi is not limited to this example and can be modified as appropriate. The distance Wi is preferably equal to or greater than the thickness of the elastic body 50 in the third direction Dz and less than 25% (e.g., about 22.5%) of smaller one of the width in the first direction Dx and the width in the second direction Dy of each of the regions separated by the signal lines Sig and the scan lines Gate in a lattice shape. Although not illustrated in FIG. 4, the distances between the sides of the first electrode 20 that are opposite to the sides denoted by Wi and the third electrode 40 are also the distance Wi.

The third electrode 40 is coupled to the power supply line Vbias that is provided outside a detection region SA in which the first electrodes 20 are provided. As illustrated in FIG. 5, the detection region SA is a region where the first electrodes 20 are provided and force from the second electrode 30 side can be detected.

As illustrated in FIG. 5, a surrounding region FA is provided so as to surround the outside of the detection region SA. The power supply line Vbias is provided so as to trace the surrounding region FA. The power supply line Vbias and the third electrode 40 are coupled in the third direction Dz via contacts 45. Specifically, the third electrode 40 has an extending portion 40*a* that extends from the detection region SA to the surrounding region FA. The extending portion 40*a* overlaps with the power supply line Vbias and the contacts 45 in a plan view. The extending portion 40*a* is coupled to the power supply line Vbias via the contacts 45. As a result, the third electrode 40 has the same potential as a potential (e.g., a constant potential C4, which is described later) of the power supply line Vbias. In this way, the power supply line Vbias functions as a power supply. The power supply line Vbias is formed in the same layer as any one of the wiring layers that are on or above the substrate 10 and on the lower side of the covering portion HRC (e.g., the first wiring layer

12, the second wiring layer 15, the third wiring layer 17, and the fourth wiring layer 19). The power supply line Vbias is not limited to being formed as described above. For example, a wiring layer for the power supply line Vbias only may be stacked on or above the substrate 10. The contacts 45 are formed in contact holes that are formed so as to penetrate the covering portion HRC and the insulation layers located on the upper side of the wiring layer in the third direction Dz so as to couple the third electrode 40 and the wiring layer in which the power supply line Vbias is formed.

FIG. 5 exemplarily illustrates the surrounding region FA near one corner of the periphery of the detection region SA, but the surrounding region FA is actually provided so as to surround the detection region SA in a plan view. The power supply line Vbias is provided so as to overlap with the surrounding region FA and surround the detection region SA in a plan view. The contacts 45 are provided so as to overlap with the surrounding region FA, surround the detection region SA, and trace the power supply line Vbias in a plan view. In FIG. 5, the contacts 45 are provided in a single line so as to trace the power supply line Vbias. The contacts 45 may be provided in multiple lines so as to trace the power supply line Vbias.

The reset circuit RC illustrated in FIG. 3, which is not illustrated in FIGS. 4 and 5, is shared by the arrays that share the signal line Sig. The reset potential line VR1 may be shared by all of the reset circuits RC.

Figure 6:
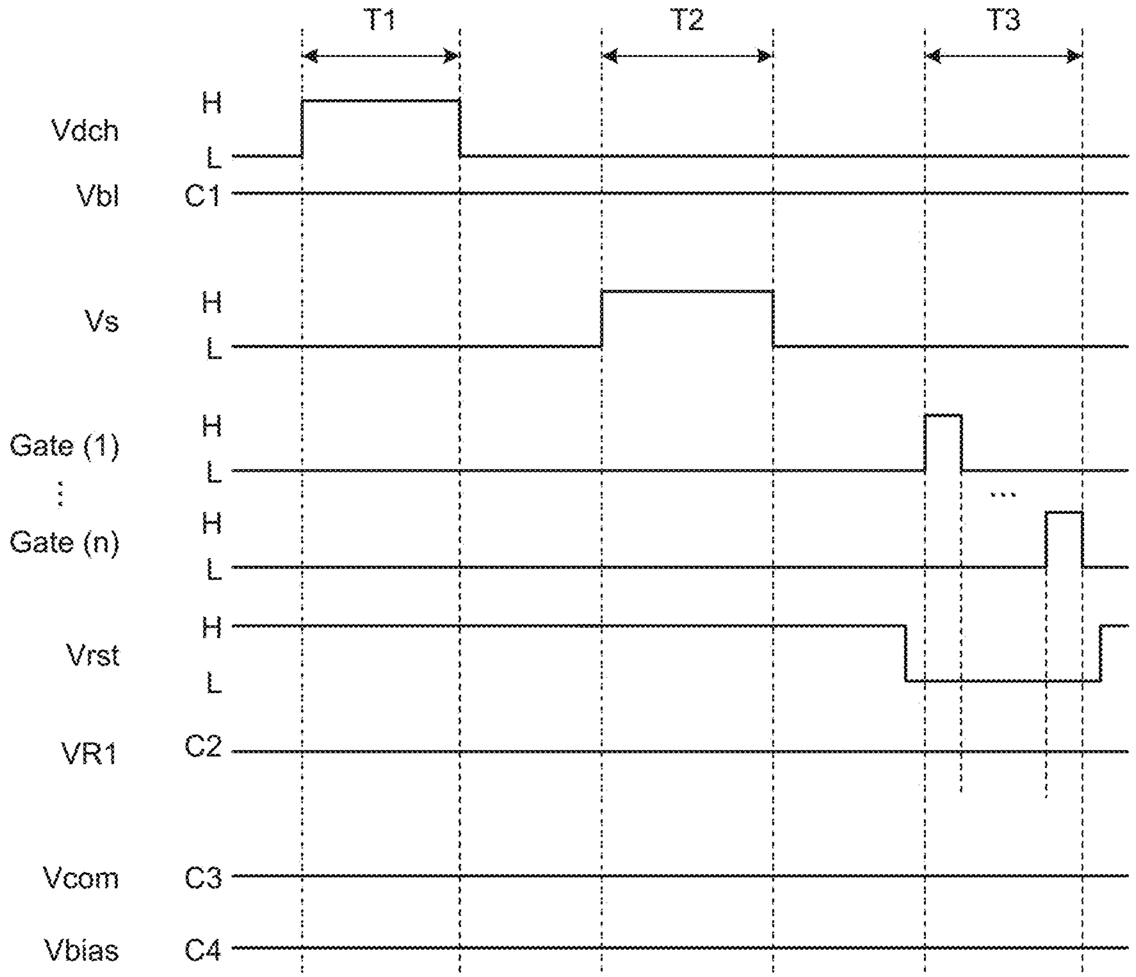
FIG. 6 is a timing chart illustrating exemplary electrical control of operation of the force sensor including the circuit illustrated in FIG. 3.

FIG. 6 is a timing chart illustrating exemplary electrical control of operation of the force sensor 1 including the circuit illustrated in FIG. 3. In a period other than a period T1 notably denoted in FIG. 6, the third element 63 is in a state (an OFF state) where signal transmission between the source and the drain is shut off. In a period other than a period T2 notably denoted in FIG. 6, the first element 61 is in the state (OFF state) where signal transmission between the source and the drain is shut off. In a period other than a period T3 notably denoted in FIG. 6, the second element 62 is in the state (OFF state) where signal transmission between the source and the drain is shut off. In the period other than the period T3 notably denoted in FIG. 6, the fourth element 64 is in a state (an ON state) where signal transmission between the source and the drain is enabled. In other words, the initialization signal transmission line Vdch, the detection operation signal transmission line Vs, the reset signal transmission line Vrst, and the scan line Gate in the periods other than the periods T1, T2, and T3 are set to have such potentials that the states of the first element 61, the second element 62, the third element 63, and the fourth element 64 are achieved as described above. Each of the potentials of the initialization potential line Vbl, the reset potential line VR1, the common potential line Vcom, and the power supply line Vbias is individually predetermined to be a constant potential. The constant potential C1 of the initialization potential line Vbl, a constant potential C2 of the reset potential line VR1, a constant potential C3 of the common potential line Vcom, and a constant potential C4 of the power supply line Vbias, which are illustrated in FIG. 6, may be different from one another. Some of the constant potentials C1 to C4 may be equal. In the embodiment, the constant potentials C3 and C4 are equal.

The scan lines Gate are provided such that the number of scan lines Gate corresponds to that of arrays arranged in the first direction Dx. In FIG. 6, the scan lines Gate are denoted as scan line Gate (1), . . . , and scan line Gate (n). The scan lines Gate A sequentially receives a drive signal from a scan circuit (not illustrated). The scan circuit includes a shift register, for example. The number of shift outputs of the shift register is the same as the number (n) of scan lines Gate. n is a natural number equal to or larger than two. The scan line Gate to which the shift register applies the drive signal output from the scan circuit is sequentially shifted from the scan line Gate (1) to the scan line Gate (n).

In the period T1, the potential of the initialization signal transmission line Vdch becomes high (H). This causes the circuit between the source and the drain of the third element 63 to be in a coupling state. As a result, the other of the two terminals of the capacitor 70 coupled to the other of the source and the drain of the third element 63 is electrically coupled to the initialization potential line Vbl. Upon being electrically coupled to the initialization potential line Vbl, the capacitor 70 releases a capacitance held before being coupled. That is, the capacitance held by the capacitor 70 is caused to correspond to a potential difference between the common potential line Vcom and the initialization potential line Vbl. This state is a state where the capacitor 70 is reset. As described above, the initialization signal transmission line Vdch is shared by all of the arrays. Therefore, the capacitors 70 of all of the arrays are reset in the period T1.

In the period T2, the potential of the detection operation signal transmission line Vs becomes high (H). This causes the circuit between the source and the drain of the first element 61 to be in a coupling state. As a result, the power supply line Vbias is coupled to or not coupled to the one of the terminals of the capacitor 70 depending on ON and OFF of the switch 80 coupled to the one of the source and the drain of the first element 61. Specifically, when the force sensor 1 receives force from the second electrode 30 side, the power supply line Vbias is coupled to the one of the terminals of the capacitor 70. When the force sensor 1 does not receive force from the second electrode 30 side, the power supply line Vbias is not coupled to the one of the terminals of the capacitor 70. In this way, the capacitance stored in the capacitor 70 changes depending on whether the force sensor 1 receives force from the second electrode 30 side in the period T2.

In the period T3, the potential of the reset signal transmission line Vrst becomes low (L). In a period other than the period T3 and some periods before and after the period T3, the fourth element 64 is in the ON state. As a result, the signal line Sig and the reset potential line VR1 are coupled. In the period where the fourth element 64 is in the ON state, the potential of the signal line Sig is reset by the potential of the reset potential line VR1. Before and after the period T3, the potential of the reset signal transmission line Vrst is reversed (H to L and L to H). As a result, the potential of the reset signal transmission line Vrst becomes low (L) in the period T3. This causes the coupling between the signal line Sig and the reset potential line VR1 to be cut off.

In the period T3, the potentials of the scan lines Gate (1) to (n) are sequentially controlled to be reversed from low (L) to high (H) and from high (H) to low (L). FIG. 6 illustrates an example where any of the potential of the scan lines Gate (1) to (n) becomes high (H) in response to the application of the drive signal. As a result, the second elements 62 of the arrays that do not share the signal line Sig but share the scan line Gate, that is, the arrays arranged in the first direction Dx, are sequentially brought into the ON state, whereby the capacitors 70 and the signal lines Sig are coupled sequentially. The potential of each of the signal lines Sig becomes the potential corresponding to the capacitance held by the capacitor 70. This makes it possible for the force sensor 1 coupled to the signal lines Sig to detect force. The force sensor 1 is a circuit that determines whether the force sensor

1 receives force from the second electrode 30 side on the basis of the potentials of the signal lines Sig.

The force sensor 1 includes various circuits (not illustrated) for the electrical controlling described with reference to FIG. 6. Specifically, the force sensor 1 includes a power source circuit and a control circuit, for example. The power source circuit supplies the potentials corresponding to high (H) and low (L) of each of the initialization signal transmission line Vdch, the initialization potential line Vbl, the detection operation signal transmission line Vs, the reset signal transmission line Vrst, and the like, and the potentials corresponding to the constant potentials C1, C2, C3, and C4. The control circuit controls switching of high (H) and low (L) corresponding to the periods T1, T2, and T3 described with reference to FIG. 6.

The above explanation is made based on the circuit structure illustrated in FIG. 3. The circuit structure of the force sensor 1 is, however, not limited to that illustrated in FIG. 3. In principle, the operation of the force sensor in the present disclosure is achieved by the first element 61, the second element 62, the capacitor 70, the switch 80, and potential supply to their source-drain couplings and their gates. The third element 63 and the fourth element 64 are an example of a specific element for the potential reset, and are not essential for force detection.

As described with reference to FIGS. 1, 2, 4 and 5, in the force sensor 1 of the embodiment, the first electrode 20 and the third electrode 40 are spaced apart with the opening 25 interposed therebetween. In other words, the first electrode 20 and the third electrode 40 are provided in such a positional relation that the first electrode 20 and the third electrode 40 are not in contact with each other but close to each other by being spaced apart with the distance Wi (refer to FIG. 4). Wherever force from the second electrode 30 side is detected in the detection region SA including the first electrodes 20 arranged along the plate surface of the substrate 10, electrical separation distances between the first electrodes 20 and the third electrode 40 that are electrically coupled to each other in response to the force are substantially the same. This is because the distances between the first electrodes 20 and the third electrode 40 are made uniform to be the distance Wi, and thus, the conduction path length of each second electrode 30 is substantially the same as the length of the distance Wi when the first electrode 20 and the third electrode 40 is electrically coupled to each other via the conductive particles 51 and the second electrode 30. Furthermore, in the embodiment, the potential of the power supply line Vbias is supplied via the third electrode 40 having a lower sheet resistance than that of the second electrode 30. As a result, a current from the power supply line Vbias to the conduction path of the second electrode 30 is almost not attenuated. Consequently, the electrical state where the conduction path is established between the first electrode 20 and the third electrode 40 and the electrical state where the conduction path therebetween is not established are clearly distinguished at any position where the force from the second electrode 30 side is applied in the detection region SA. As described above, according to the embodiment, it is possible to stably detect force regardless of the detection position of the force.

Figure 7:
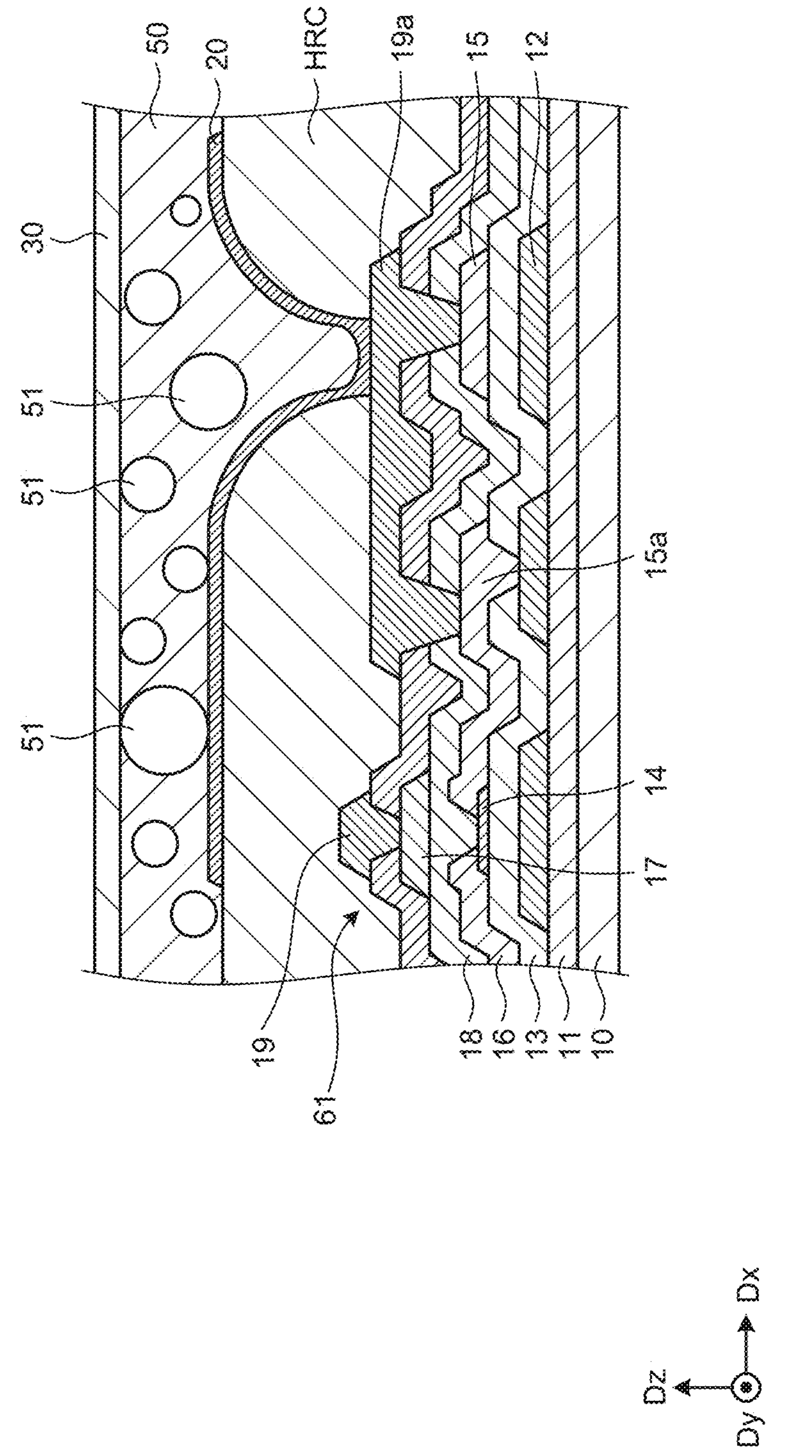
FIG. 7 is a cross-sectional view illustrating an exemplary structure of a force sensor as a reference example.

FIG. 7 is a cross-sectional view illustrating an exemplary structure of a force sensor as a reference example. The force sensor illustrated in FIG. 7 differs from that of the embodiment in that the force sensor does not include the third electrode 40. Thus, a power supply source having the same potential as the power supply line Vbias is coupled to the second electrode 30. This reference example does not have a structure for coupling the power supply source and the second electrode 30 in the detection region SA. Thus, the second electrode 30 is necessarily coupled to the power supply source outside the detection region SA. FIG. 7 illustrates the elastic body 50 in a state of receiving force from the second electrode 30 side.

The sheet resistance of the second electrode 30 is higher than that of the third electrode 40 in the embodiment. Thus, as the detection position of force is further away from the power supply source in the reference example, attenuation of the current from the power supply source is increased due to the sheet resistance of the second electrode 30. Consequently, as the detection position of force is further away from the power supply source in the reference example, the electrical state where the conduction path between the second electrode 30 and the third electrode 40 is established as illustrated in FIG. 7 and the electrical state where the conduction path is not established are more hardly distinguished. This is because the increase in the attenuation of the current from the power supply source due to the sheet resistance of the second electrode 30 indicates that, even when the conduction path is established, the electrical change due to the influence of the current becomes smaller. In contrast to the reference example, the force sensor of the embodiment can reduce variation in the detection accuracy depending on the positional relation between the detection position of force in the detection region SA and the power supply source. The embodiment can stably detect force regardless of the detection position of the force, as described above.

As described above, the force sensor 1 in the embodiment includes the first electrodes 20 arranged along the substrate 10, the elastic body 50 that is in contact with the first electrodes 20, the second electrode 30 that is in contact with the elastic body 50 and has the elastic body 50 interposed between the second electrode 30 and the first electrodes 20, and the third electrode 40 that is provided on the substrate 10 side of the second electrode 30 and configured to be electrically coupled to the second electrode 30. The elastic body 50 includes the conductive particles that electrically couple the first electrodes 20 and the second electrode 30 when force is applied that causes the first electrodes 20 and the second electrode 30 to be approached. The third electrode 40 has a continuous lattice shape that separates at least the first electrodes 20 adjacent in one direction from each other.

Specifically, the third electrode 40 having the same potential as the second electrode 30 that is coupled to the first electrode 20 when force is applied is disposed near the first electrode 20 so as to separate the adjacent first electrodes 20 from each other. This allows the first electrode 20 and the third electrode 40, which are electrically coupled when force is applied, to be put in a closer positional relation. This makes it easy to more stabilize the electrical characteristics of the switch (e.g., switch 80) including the first electrode 20 and the third electrode 40 regardless of the arrangement of the switch. Thus, the force sensor 1 can stably detect force regardless of the detection position of the force.

The force sensor 1 has the detection region SA in which the first electrodes 20 are arranged in a matrix of a row-column configuration, and the transistors (second elements 62). The detection region SA includes the signal lines Sig along in one of the row direction (first direction Dx) and the column direction (second direction Dy), and the scan lines Gate along the other of the row and the column directions. One of the source and the drain of the transistor is coupled to the substrate 10 via the first element 61, the other of the source and the drain is coupled to the signal line Sig, and the gate of the transistor is coupled to the scan line Gate. With this configuration, the transistors are operated on a scan line Gate basis. A signal indicating the electrical state of the first electrode 20 coupled to the operated transistor via the first element 61 is obtained via the signal line Sig. That is, the electrical states of the first electrodes 20 can be scanned by scanning the scan lines Gate. This makes it possible to detect the force-applied portion where the electrical coupling between the first electrode 20 and the second electrode 30 is established in the detection region SA.

The third electrode 40 and the first electrodes 20 are formed in the same layer. This allows the first electrodes 20 and the third electrode 40 to be formed in the same process, thereby making it possible to manufacture the force sensor 1 at a lower cost.

The third electrode 40 is continuous along the substrate 10 so as to surround the four sides of each first electrode 20. This makes it possible to achieve a more qualitative positional relation between the first electrode 20 and the third electrode 40 having the same potential as the second electrode 30 coupled to the first electrode 20 when force is applied. As a result, the electrical characteristics of the switch (e.g., switch 80) including the first electrode 20 and the third electrode 40 can be easily more stabilized regardless of the arrangement of the switch.

The sheet resistance of the third electrode 40 is less than that of the second electrode 30. With this configuration, among the first electrode 20, the second electrode 30, and the third electrode 40 that are coupled when force is applied, the conduction path including the first electrode 20 and the third electrode 40 nearest to the first electrode 20 is established. As a result, the electrical characteristics of the switch (e.g., switch 80) including the first electrode 20 and the third electrode 40 is more easily stabilized regardless of the arrangement of the switch.

The third electrode 40 has the extending portion 40*a* that extends to the outside (surrounding region FA) of the region (detection region SA) in which the first electrodes 20 are provided and is coupled to the power supply line Vbias. The first electrode 20 and the third electrode 40 are electrically coupled when force causing the first electrode 20 and the second electrode 30 to be approached is applied. This makes it possible to provide commonality between the structure in which the first electrode 20 and the third electrode 40 are coupled and the structure in which the first electrode 20 and the second electrode 30 are coupled. As a result, the force sensor 1 can be manufactured at a lower cost.

The second electrode 30 is electrically floating when the second electrode 30 is not electrically coupled to the third electrode 40. This can eliminates a structure for externally applying a specific potential to the second electrode 30 constantly. As a result, the force sensor 1 can be manufactured at a lower cost.

MODIFICATIONS

The following describes modifications having structures that differ partially from the structure of the embodiment with reference to FIGS. 8 to 11. The same structure as the embodiment in the modifications has the same symbol as that in the embodiment, and the description thereof is omitted in some cases.

First Modification

Figure 8:
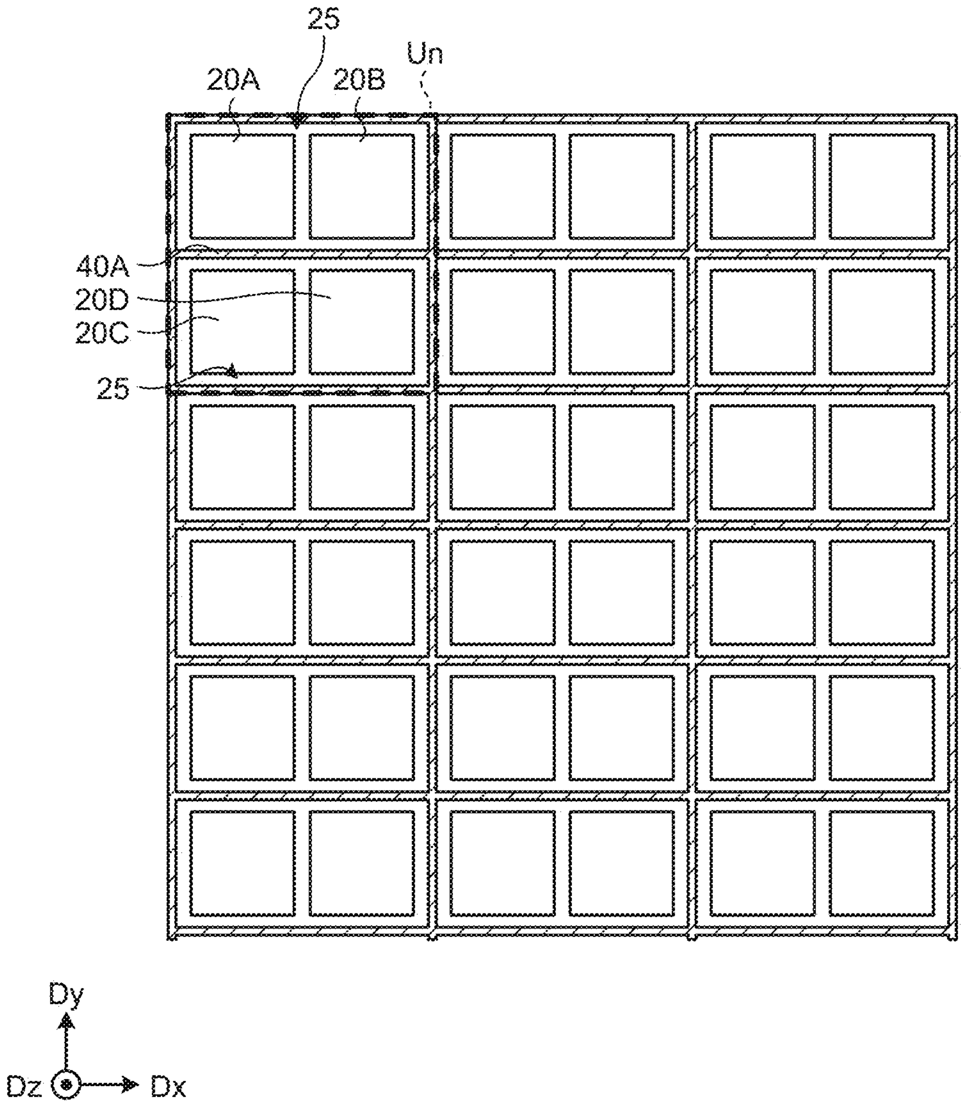
FIG. 8 is a plan view exemplarily illustrating shapes of electrodes in a detection region of a force sensor in a first modification.

FIG. 8 is a plan view exemplarily illustrating the shapes of the electrodes in the detection region SA of a force sensor in a first modification. As illustrated in FIG. 8, in the first modification, array electrodes 20A, 20B, 20C, and 20D, and a third electrode 40A (hatched part) are provided in an array Un. FIG. 8 exemplarily illustrates the arrays Un arranged in a matrix of 3×3, i.e., three arrays Un arranged in the first direction Dx and three arrays Un arranged in the second direction Dy, although the symbols thereof are omitted. In the detection region SA, more arrays Un may be arranged or fewer arrays Un may be arranged. As described above, in the force sensor in the first modification, the multiple arrays Un are arranged in the detection region SA in a matrix of a row-column configuration in a plan view.

The array electrodes 20A, 20B, 20C, and 20D each have the same structure as the first electrode 20 in the embodiment from a functional point of view. A third electrode 40A has the same structure as the third electrode 40 in the embodiment from a functional point of view. In the first modification, the first electrode 20 in each array in the embodiment is replaced with the array electrodes 20A, 20B, 20C, and 20D serving as the first electrodes. In the first modification, the structure of the third electrode 40 in a plan view in the embodiment is modified to that of the third electrode 40A in accordance with the number, the shapes, and the arrangement of the first electrodes.

In the example illustrated in FIG. 8, the array electrodes 20A and 20B arranged in the first direction Dx in the array Un are adjacent to each other without the third electrode 40A therebetween. The array electrodes 20C and 20D arranged in the first direction Dx in the array Un are adjacent to each other without the third electrode 40A therebetween. The array electrodes 20A and 20C arranged in the second direction Dy in the array Un are adjacent to each other with the third electrode 40A therebetween. The array electrodes 20B and 20D arranged in the second direction Dy in the array Un are adjacent to each other with the third electrode 40A therebetween. As described above, the third electrode 40A has a continuous lattice shape that separates at least the first electrodes adjacent in one direction (e.g., the second direction Dy) from each other out of the first electrodes adjacent in the array Un. The positional relation between the first electrodes and the third electrode 40A in the array Un is not limited to this example. For example, the first direction Dx and the second direction Dy in FIG. 8 may be interchanged. The third electrode 40A may further extend so as to separate the array electrode 20A from the array electrode 20B, and separate the array electrode 20C from the array electrode 20D in the array Un.

In the first modification, the first electrodes such as the array electrodes 20A, 20B, 20C, and 20D, which are provided in one array Un, share one second element 62. The first modification may have a structure in which the first element 61 illustrated in FIG. 3 is excluded and the switch 80 is coupled to the second element 62, the third element 63, and the capacitor 70. The open and close (ON and OFF) of the switch 80 in the first modification is switching between the conduction (ON) and non-conduction (OFF) among the third electrode 40, the second electrode 30, and the array electrodes 20A, 20B, 20C, and 20D.

Figure 9:
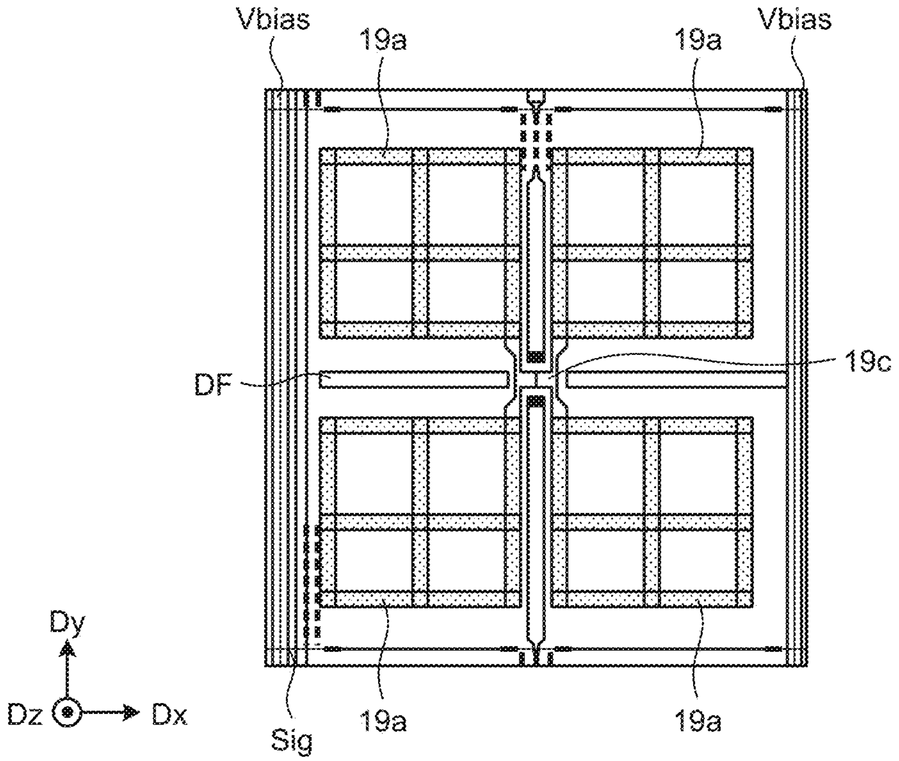
FIG. 9 is a plan view illustrating an exemplary wiring layer in which power supply lines Vbias and a signal line Sig are provided in an array Un.

FIG. 9 is a plan view illustrating an exemplary wiring layer in which the power supply lines Vbias and the signal line Sig are provided in the array Un.

Figure 10:
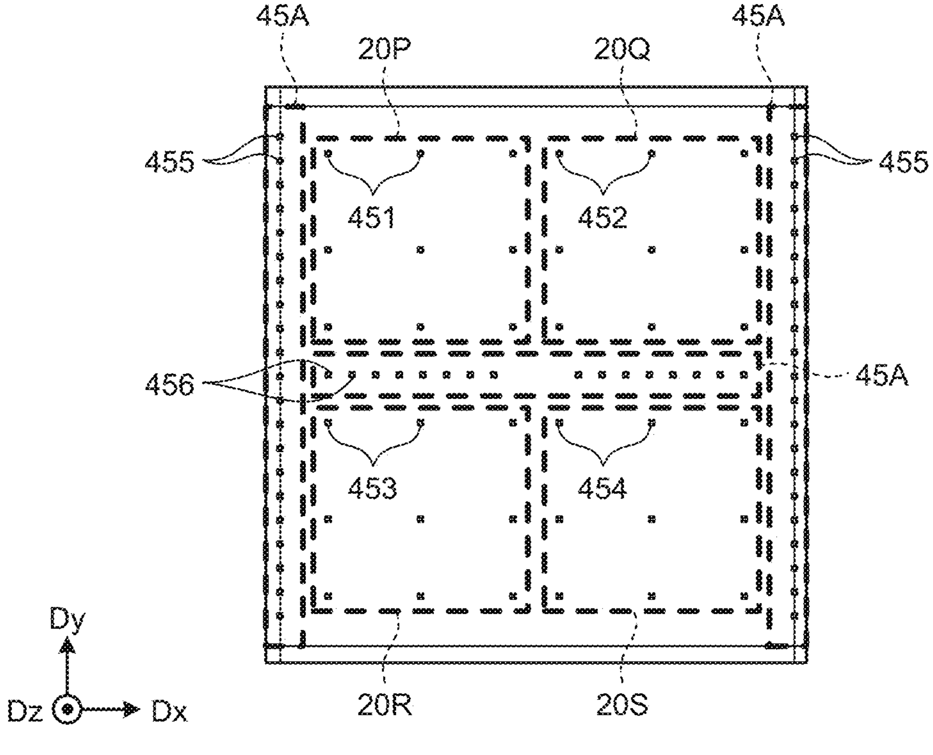
FIG. 10 is a plan view illustrating an exemplary arrangement of contacts that couple the electrode layer illustrated in FIG. 8 and the wiring layer illustrated in FIG. 9 in the array Un.

FIG. 10 is a plan view illustrating an exemplary arrangement of contacts that couple the electrode layer illustrated in FIG. 8 and the wiring layer illustrated in FIG. 9 in the array Un. The contacts illustrated in FIG. 10 are formed so as to penetrate the covering portion HRC.

As illustrated in FIG. 9, coupling portions 19*a* in the first modification extend so as to correspond to the shapes and arrangement of the array electrodes 20A, 20B, 20C, and 20D in a plan view. The coupling portions 19*a* extending as described above are coupled to the array electrodes 20A, 20B, 20C, and 20D via one or more contacts included in contact formation regions 20P, 20Q, 20R, and 20S illustrated in FIG. 10. Specifically, the array electrode 20A is coupled to the coupling portion 19*a* illustrated in FIG. 9 via contacts 451 included in the contact formation region 20P illustrated in FIG. 10. The array electrode 20B is coupled to the coupling portion 19*a* illustrated in FIG. 9 via contacts 452 included in the contact formation region 20Q illustrated in FIG. 10. The array electrode 20C is coupled to the coupling portion 19*a* illustrated in FIG. 9 via contacts 453 included in the contact formation region 20R illustrated in FIG. 10. The array electrode 20D is coupled to the coupling portion 19*a* illustrated in FIG. 9 via contacts 454 included in the contact formation region 20S illustrated in FIG. 10.

The coupling portions 19*a* each of which is coupled to one of the array electrodes 20A, 20B, 20C, and 20D are mutually coupled via a common coupling portion 19*c* positioned at or near the center of the array Un, for example. The common coupling portion 19*c* is provided in the same layer as the coupling portions 19*a*. The structure in which the coupling portion 19*a* and the electrode 15*a* are coupled in FIG. 1 is replaced with the coupling between the common coupling portion 19*c* and the electrode 15*a* (refer to FIG. 1) in the first modification. The concrete coupling portion form between the coupling portion 19*a* and the electrode 15*a* is not limited to this example, and can be modified as appropriate. The number and the arrangement of array electrodes such as the array electrodes 20A, 20B, 20C, and 20D are not limited to those in the example illustrated in FIG. 9, and can be modified as appropriate. For example, one of the array electrodes may be positioned on the upper side of the common coupling portion 19*c* in a plan view. In this case, a contact is provided that couples the array electrode and the common coupling portion 19*c*. As the number of contacts that couple the coupling portion 19*a* (or the common coupling portion 19*c*) and the array electrode is increased, the number of current paths between these coupling structures is increased, thereby making it possible to further reduce an electrical resistance of each contact. The coupling between the array electrode and the common coupling portion 19*c* via the contacts may be employed from this point of view.

As illustrated in FIG. 9, the power supply lines Vbias in the first modification extend in the second direction Dy so as to be arranged without being in contact with the coupling portions 19*a* and the signal line Sig. Specifically, the power supply lines Vbias are provided along the two sides that face each other in the first direction Dx and extend in the second direction Dy among the four sides of the array Un. The power supply lines Vbias and the third electrode 40A are coupled via contacts 455 included in contact formation regions 45A illustrated in FIG. 10. A dummy electrode DF illustrated in FIG. 9 is disposed at a portion corresponding to the space between the array electrodes 20A and 20C illustrated in FIG. 8. The dummy electrode DF is coupled to the third electrode 40A via contacts 456 positioned between the contact formation regions 20P and 20R among the contacts included in the contact formation region 45A illustrated in FIG. 10. The potential of the power supply line Vbias is applied to the dummy electrode DF via the contacts in the contact formation region 45A and the third electrode 40A. This makes it possible to make the electrical characteristics between the array electrodes 20A and 20C closer to the electrical characteristics between the array electrodes 20B and 20D, thereby making it possible to increase detection accuracy of force. In FIG. 10, two of the contacts (contacts 451, 452, 453, 454, 455, and 456) in each region are representatively labeled with the numerals. The objects illustrated in the same shapes (e.g., square shape) as those labeled with the numerals also function as the contacts in the same manner as those labeled with the numerals.

In the first modification, the adjacent arrays Un in the arrays Un arranged in a matrix of a row-column configuration share the power supply line Vbias and the third electrode 40A that are positioned between the adjacent arrays Un.

The wiring layer illustrated in FIG. 9 is the fourth wiring layer 19 (refer to FIG. 1) in the embodiment, for example, but is not limited to this, and may be another wiring layer. In this case, the contacts illustrated in FIG. 10 and the contact holes for establishing couplings by the contacts extend to the other wiring layer.

In the first modification described with reference to FIGS. 8 to 10, the four first electrodes (array electrodes 20A, 20B, 20C, and 20D) in the array Un share one second element 62. In the first modification, the number of first electrodes sharing the second element 62 is not limited to four and may be equal to or larger than two. The arrangement of the first electrodes sharing the one second element 62 in a plan view and the shape of each first electrode are not limited to specific ones.

The first modification is the same as the embodiment except for those notably described above. In the same manner as the embodiment, the elastic body 50 and the second electrode 30 are provided on the upper side of the electrode layer in which the array electrodes 20A, 20B, 20C, and 20D and the third electrode 40A are formed.

In the structure where the first electrodes share one second element 62 such as that in the first modification, the same conduction as the conduction between the first electrode 20 and the second electrode 30 (refer to FIG. 2) in the embodiment occurs individually for each of the first electrodes in response to force from the second electrode 30 side. Therefore, the conduction between the second electrode 30 and some of the first electrodes and the conduction between the second electrode 30 and all of the first electrodes occur. That is, the conduction can occur between the second electrode 30 and at least one of the first electrodes. For example, the structure as illustrated in FIG. 8 in which the array electrodes 20A, 20B, 20C, and 20D share one second element 62 allows the following cases. In a first case, none of the array electrodes 20A, 20B, 20C, and 20D is electrically coupled to the second electrode 30. In a second case, one of the array electrodes 20A, 20B, 20C, and 20D is electrically coupled to the second electrode 30. In a third case, two of the array electrodes 20A, 20B, 20C, and 20D are electrically coupled to the second electrode 30. In a fourth case, three of the array electrodes 20A, 20B, 20C, and 20D are electrically coupled to the second electrode 30. In a fifth case, four of the array electrodes 20A, 20B, 20C, and 20D are electrically coupled to the second electrode 30. The detection circuit that is coupled to the signal lines Sig and has electrical resolution with which each of the first to the fifth cases can be identified, allows force detection by each array of the force sensor to have gradation. In other words, the first to the fifth cases that occur depending on strength of force from the second electrode 30 side are allowed to be detected individually, whereby a level of the strength of force can be detected in addition to presence or absence of the force. The first to the fifth cases are exemplified in this modification.

The electrical resolution of the detection circuit simply needs to correspond to the number of first electrodes sharing one second element 62.

In the first modification, one transistor (second element 62) is coupled to two or more of the first electrodes (e.g., the array electrodes 20A, 20B, 20C, and 20D). As a result, the intensity of the signal output to the signal line Sig via the transistor can be changed according to the number of first electrodes coupled to the second electrode 30 among the two or more of the first electrodes. In other words, the intensity of the signal can have the gradation according to the number of first electrodes coupled to the one transistor via the first element 61. This makes it possible to increase the detection accuracy of the force-applied portion and the force in the detection region SA.

The third electrode 40A separates at least the first electrodes adjacent in one direction from each other among the two or more of the first electrodes (e.g., the array electrodes 20A, 20B, 20C, and 20D) coupled to the one transistor (second element 62). This makes it easier to stabilize the electrical characteristics depending on the positional relation between the third electrode 40 and the two or more of the first electrodes coupled to the one transistor (second element 62) via the first element 61.

The third electrode 40A is electrically coupled to the power supply line Vbias stacked on the substrate 10 side of the third electrode 40A. This structure makes it possible to dispose the power supply line Vbias in the detection region SA to couple the power supply line Vbias to the third electrode 40A.

The power supply lines Vbias and the signal lines Sig are in the same layer. This allows the power supply lines Vbias and the signal lines Sig to be formed in the same process, thereby making it possible to manufacture the force sensor 1 at a lower cost.

Second Modification

Figure 11:
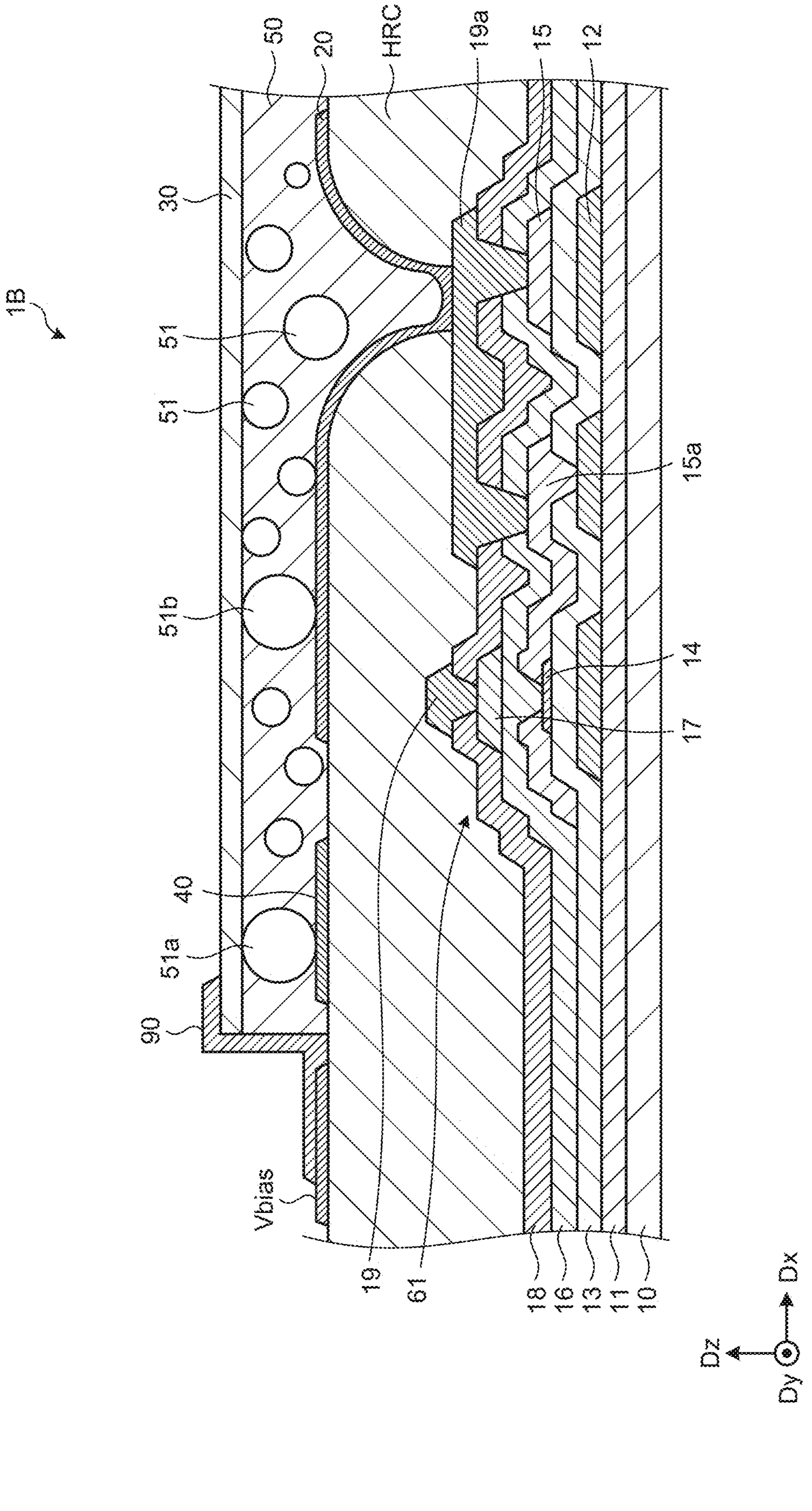
FIG. 11 is a cross-sectional view of a layered structure including main elements of a force sensor in a second modification.

FIG. 11 is a cross-sectional view illustrating a layered structure including main elements of a force sensor 1B according to a second modification. FIG. 11 illustrates the elastic body 50 that is receiving force from the second electrode 30 side. The force sensor 1B includes a conductive portion 90 in addition to the structure of the embodiment. As illustrated in FIG. 11, the force sensor 1B in the second modification includes the power supply line Vbias that is provided on the upper side of the covering portion HRC and exposed externally. The power supply line Vbias that is provided on the upper side of the covering portion HRC and exposed externally may be a retrofitted electrode that is coupled to an external power supply source supplying the same potential as the power supply line Vbias in the embodiment, or may be the third electrode 40 that extends externally.

The conductive portion 90 is a conductive tape that has conductivity and adhesiveness on its surface facing the second electrode 30 and on its surface facing the power supply line Vbias that is provided on the upper side of the covering portion HRC and exposed externally, for example. As illustrated in FIG. 11, the conductive portion 90 couples the second electrode 30 and the power supply line Vbias that is provided on the upper side of the covering portion HRC and exposed externally. As a result, the potential of the power supply line Vbias is applied to the second electrode 30. The conductive portion 90 may have another structure having the same functions.

In the second modification, the conduction is not established between the first electrode 20 and the second electrode 30 when the force sensor 1B does not receive force from the second electrode 30 side, in the same manner as the embodiment. Consequently, the presence and absence of the application of the potential of the power supply line Vbias from one side of the first element 61 is switched depending on the presence and absence of force. Thus, the force sensor of the second modification can also detect force in the same manner as the embodiment. In the second modification, the potential of the power supply line Vbias is consistently applied to the second electrode 30. This makes it possible to further stabilize the potential of the power supply line Vbias applied to the capacitor 70 (refer to FIG. 3) via the first element 61 when the force sensor 1B receives force from the second electrode 30 side. Furthermore, in the same manner as the embodiment, the first electrode 20 and the third electrode 40 are arranged close to each other with the opening 25 therebetween. This makes the electric characteristics of the array quite stable regardless of the position of the array in the row and column directions in the detection region SA. As a result, according to the second modification, it is possible to detect force with high accuracy under more stable conditions.

As described above, in the second modification, the second electrode 30 is coupled to the power supply (power supply line Vbias) provided outside the region where the first electrodes 20 are provided. This structure can preset the potential of the second electrode 30 to be equal to that of the third electrode 40, thereby making it easy to more stabilize the electrical characteristics of the switch (e.g., switch 80) including the first electrode 20, the second electrode 30, and the third electrode 40 regardless of the disposition of the switch.

Other advantageous effects brought about by the modes described in the embodiment and the modifications are understood to be naturally brought about by the present disclosure to the extent that are apparent from the description of the present specification or achieved by those skilled in the art as appropriate.

What is claimed is:

1. A force sensor comprising:
a substrate;
first electrodes that are provided on the substrate and arranged in a first direction and a second direction intersecting the first direction;
a second electrode that faces the first electrodes;
a third electrode that is provided on the substrate and has a first lattice shape;
an elastic body that is provided between the second electrode and the first and third electrodes and includes a conductive particle; and
wiring layers that are respectively coupled to the first electrodes via contact holes of the substrate, wherein
each of the wiring layers has a second lattice shape different from the first lattice shape.

2. The force sensor according to claim 1, wherein
the wiring layers include a first wiring layer, a second wiring layer, a third wiring layer, and a fourth wiring layer that are arranged in a matrix having a row-column configuration, and
a corner of the first wiring layer, a corner of the second wiring layer, a corner of the third wiring layer, and a corner of the fourth wiring layer are coupled to one another so as to face one another.

3. The force sensor according to claim 1, wherein the second lattice shape has a structure of crossed strips, and each of the wiring layers is coupled to a corresponding one of the first electrodes at crossing positions at which the strips are crossed.

4. The force sensor according to claim 3, wherein the third electrode is continuous along the substrate so as to surround each first electrode.

5. The force sensor according to claim 1, further comprising a power supply line extending in the second direction, wherein the power supply line and the third electrode are coupled to each other via a contact.

6. The force sensor according to claim 1, further comprising a dummy electrode extending in the first direction and provided between the wiring layers arranged in the second direction, wherein the dummy electrode is coupled to the third electrode via a contact.

7. The force sensor according to claim 1, further comprising a plurality of transistors, wherein the force sensor has a detection region in which the first electrodes are arranged in a matrix of a row-column configuration, the detection region is provided with a plurality of signal lines along one of a row direction and a column direction and a plurality of scan lines along the other of the row direction and the column direction, and the detection region is provided with the transistors, and sources or drains of the transistors are coupled to the first electrodes, the others of the sources and the drains of the transistors are coupled to the signal lines, and gates of the transistors are coupled to the scan lines.

8. The force sensor according to claim 1, wherein the first electrodes are formed in a same layer as the third electrode.

9. The force sensor according to claim 1, wherein a sheet resistance of the third electrode is less than a sheet resistance of the second electrode.

10. The force sensor according to claim 1, wherein the third electrode has an extending portion that extends outside a region where the first electrodes are provided and is coupled to a power supply, and the second electrode and the third electrode are electrically coupled when the force is applied.

11. The force sensor according to claim 1, wherein the second electrode is coupled to a power supply that is provided outside a region where the first electrodes are provided.

12. The force sensor according to claim 1, wherein the second electrode is electrically floating when the second electrode is not electrically coupled to the third electrode.

13. The force sensor according to claim 1, wherein the number of the first electrodes is two or more, and one of the transistors is coupled to two or more of the first electrodes.

14. The force sensor according to claim 13, wherein the third electrode separates at least the first electrodes adjacent in one direction from each other among the two or more of the first electrodes coupled to the one of the transistors.

15. The force sensor according to claim 13, wherein the third electrode is electrically coupled to a power supply stacked on the substrate side of the third electrode.

16. The force sensor according to claim 15, wherein the signal lines are in a same layer as the power supply.

* * * * *